(12) United States Patent
Oka et al.

(10) Patent No.: US 10,767,994 B2
(45) Date of Patent: Sep. 8, 2020

(54) SENSOR OUTPUT CORRECTION APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Kazumichi Oka, Kariya (JP); Hidenobu Kinugasa, Nagoya (JP); Yuji Okuda, Okazaki (JP)

(73) Assignees: DENSO CORPORATION, Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 328 days.

(21) Appl. No.: 15/738,508

(22) PCT Filed: Jun. 13, 2016

(86) PCT No.: PCT/JP2016/067535
§ 371 (c)(1),
(2) Date: Dec. 20, 2017

(87) PCT Pub. No.: WO2016/208440
PCT Pub. Date: Dec. 29, 2016

(65) Prior Publication Data
US 2018/0188029 A1 Jul. 5, 2018

(30) Foreign Application Priority Data
Jun. 26, 2015 (JP) .................................. 2015-129176

(51) Int. Cl.
*G01C 19/5776* (2012.01)
*G01D 18/00* (2006.01)
(Continued)

(52) U.S. Cl.
CPC ......... *G01C 19/5776* (2013.01); *G01C 19/00* (2013.01); *G01C 21/265* (2013.01);
(Continued)

(58) Field of Classification Search
CPC .. G01C 19/5776; G01C 25/005; G01C 19/00; G01C 21/265; G01D 3/032; G01D 18/00; G01P 21/00
See application file for complete search history.

(56) References Cited

U.S. PATENT DOCUMENTS 5,265,472 A * 11/1993 Pfeifle .................... G01P 21/00
701/70
5,424,953 A 6/1995 Masumoto et al.
(Continued)

FOREIGN PATENT DOCUMENTS

JP S58-201104 A 11/1983
JP 63-182519 A 7/1988
(Continued)

*Primary Examiner* — Mohammad K Islam
(74) *Attorney, Agent, or Firm* — Maschoff Brennan

(57) ABSTRACT

A sensor output correction system is provided which is capable of minimizing a risk that a correction value for use in zero-point correction differs from an actual deviation of a zero-point. An ECU includes a travel road information acquisition portion which obtains a curvature of a travel road on which a system-mounted vehicle is traveling and a vehicle information acquisition portion which obtains a detected value of a yaw rate sensor. The ECU determines whether the system-mounted vehicle is traveling on a straight path or not based on the curvature derived by the travel road information acquisition portion. The ECU determines a value (i.e., a zero-point equivalent value) which corresponds to a deviation of a current zero point of the yaw rate sensor based on detected values of the yaw rate sensor sampled while the system-mounted vehicle is moving on the
(Continued)

straight path. The ECU determines a correction value which is subtracted from the detected value using the zero-point equivalent value.

5 Claims, 6 Drawing Sheets

(51) Int. Cl.
*G01P 21/00* (2006.01)
*G01C 21/26* (2006.01)
*G01C 19/00* (2013.01)
*G01D 3/032* (2006.01)
*G01C 25/00* (2006.01)

(52) U.S. Cl.
CPC ........... *G01C 25/005* (2013.01); *G01D 3/032* (2013.01); *G01D 18/00* (2013.01); *G01P 21/00* (2013.01)

(56) References Cited

U.S. PATENT DOCUMENTS

| | | | |
|---|---|---|---|
| 5,906,653 A | 5/1999 | Ichimura et al. | |
| 6,204,499 B1* | 3/2001 | Schaefer | G01D 5/30 250/227.14 |
| 9,139,173 B2* | 9/2015 | Yasui | B60K 31/0075 |
| 2004/0209594 A1* | 10/2004 | Naboulsi | G06F 3/017 455/404.1 |
| 2010/0017164 A1* | 1/2010 | Wallin | G01L 25/003 702/104 |
| 2010/0317420 A1* | 12/2010 | Hoffberg | G06Q 30/0207 463/1 |
| 2011/0295549 A1* | 12/2011 | Takabayashi | G01S 7/4004 702/142 |
| 2012/0089297 A1 | 4/2012 | Shimizu | |
| 2013/0190984 A1* | 7/2013 | Kawai | B62D 6/00 701/41 |
| 2013/0190985 A1* | 7/2013 | Nakano | B62D 6/00 701/41 |
| 2013/0304327 A1* | 11/2013 | Morishita | B62D 5/0463 701/43 |
| 2015/0055831 A1 | 2/2015 | Kawasaki et al. | |
| 2015/0177272 A1* | 6/2015 | Clark | G01P 15/097 850/5 |
| 2015/0274174 A1* | 10/2015 | Tao | B60W 40/076 701/1 |
| 2016/0229447 A1* | 8/2016 | Wada | B62D 6/007 |
| 2016/0303485 A1* | 10/2016 | Kawamura | A63H 30/04 |

FOREIGN PATENT DOCUMENTS

| | | |
|---|---|---|
| JP | S63-182519 | 7/1988 |
| JP | H05-187879 A | 7/1993 |
| JP | 6-213659 A | 8/1994 |
| JP | H07-159438 | 6/1995 |
| JP | H09-93716 A | 4/1997 |
| JP | H09-152338 A | 6/1997 |
| JP | 2007-106210 A | 4/2007 |
| JP | 2008-058185 | 3/2008 |
| JP | 2010-107244 A | 5/2010 |
| JP | 2013-196341 A | 9/2013 |
| JP | 2014-21826 A | 2/2014 |
| WO | 2009/113505 A1 | 9/2009 |
| WO | 2010/140234 A1 | 12/2010 |

\* cited by examiner

SENSOR OUTPUT CORRECTION APPARATUS

TECHNICAL FIELD

The present invention generally relates to a sensor output correction apparatus designed to correct an output value of a sensor installed in a vehicle.

BACKGROUND ART

There are vehicles in which various types of sensors, such as a yaw rate sensor, a steering angle sensor, and an acceleration sensor, are mounted. Errors contained in output values of such sensors (which will also be referred to as detected values) are preferably zero for use in various control operations.

Actually, the center value of a sensor output (i.e., a zero-point) is shifted from a design zero-point (i.e., zero) due to aging or temperature characteristics of the sensor or an initial deviation of the sensor output, thus resulting in an error of the detected value caused by the shift in the zero-point. In order to eliminate such a problem, various structures have been proposed which calculate an amount of deviation of the zero-point of the sensor and correct a detected value of the sensor using the calculated amount of the deviation.

For instance, Japanese Patent First Publication No. 2010-107244 discloses a structure which calculates a correction value corresponding to a deviation of the zero-point of an acceleration sensor using a detected value of the acceleration sensor in an interval between when a door of a vehicle is opened and when the door is closed, and uses an output of the acceleration sensor derived by subtracting the deviation of the zero-point from a detected value of the acceleration sensor.

SUMMARY OF THE INVENTION

Problem to be Solved by the Invention

The method, as taught in Japanese Patent First Publication No. 2010-107244, uses the detected value of the sensor between when the door of the vehicle is opened and when the door is closed as a reference for calculating the correction value. A condition where the door of the vehicle is opened while an ignition power supply is currently turned on is a limited condition, such as starting or parking of the vehicle.

The method in Japanese Patent First Publication No. 2010-107244, therefore, has less chance to sample the detected value of the sensor which is used as the reference in calculating the correction value, which will lead to less chance of calculating or updating the correction value.

The zero-point of the sensor, as described above, depends upon an ambient temperature of the sensor and, thus dynamically varies while the vehicle is moving. The method, as taught in Japanese Patent First Publication No. 2010-107244, has fewer chances to update the correction value, which results in a risk that the correction value for use in correcting the zero-point differs from a real deviation.

The invention was made in view of the above problems. It is an object of the invention to a sensor output correction apparatus which is capable of minimizing a risk that a correction value for use in correcting a zero-point differs from a real deviation of the zero-point.

Means for Solving the Problem

The invention for achieving the object is a sensor output correction apparatus comprising: (a) a detected value acquisition portion (F1) which sequentially acquires a detected value of a sensor which is mounted in a vehicle and detects a given physical quantity acting on the vehicle; (b) a curvature determining portion (F3) which determines a curvature of a travel road on which the vehicle is moving; (c) a zero-point determination portion (F5) which determines a zero-point equivalent value that is a value corresponding to a current zero point of said sensor using the detected value of said sensor derived by the detected value acquisition portion when the curvature, as determined by the curvature determining portion, is less than or equal to a given approximation threshold value at which said travel road is approximated as being a straight path; and (d) a correction value determination portion (F6) which determines a correction value for removing an error, as arising from a deviation of the zero point of the sensor, from the detected value of said sensor using the zero-point equivalent value determined by the zero-point determination portion.

With the above arrangements, the zero-point determination portion determines the zero-point equivalent value corresponding to a current zero point of the sensor based on the detected values of the sensor sampled while the vehicle is moving on the straight road. The correction value determination portion determines the correction value for executing zero-point correction using the zero-point equivalent value determined by the zero-point determination portion.

With the above arrangements, it is possible to determine the correction value corresponding to a deviation of the current zero point while the vehicle is moving. This eliminates a risk that the correction value for use in the zero-point correction differs from an actual deviation of the zero point.

The reference symbols noted in brackets recited in claims represent correspondence relations to specific means described in embodiments, as will be discussed later, and do not limit the technical field of the invention.

EMBODIMENT FOR CARRYING OUT THE INVENTION

Figure 1:
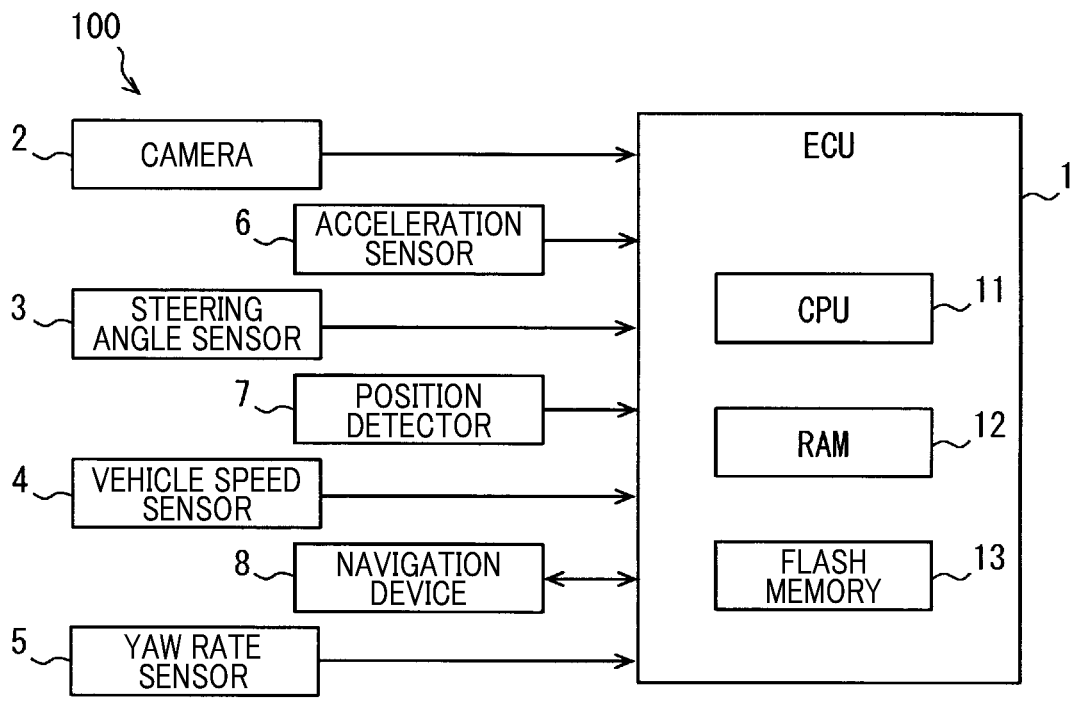
FIG. 1 is a block diagram which shows an example of a schematic structure of an in-vehicle system 100 according to an embodiment.

Embodiments of the invention will be described below using the drawings. FIG. 1 schematically illustrates a structure of an in-vehicle system 100 equipped with an ECU (Electronic Control Unit) 1 which has a function as a sensor output correction apparatus according to the invention.

The in-vehicle system 100 is installed in the vehicle and, as illustrated in FIG. 1, includes the ECU 1, the camera 2, the steering angle sensor 3, the vehicle speed sensor 4, the yaw rate sensor 5, the acceleration sensor 6, the position detector 7, and the navigation device 8. The ECU 1 connects with the camera 2, the steering angle sensor 3, the vehicle speed sensor 4, the yaw rate sensor 5, the acceleration sensor 6, the position detector 7, and the navigation device 8 and is communicable therewith through a communications network developed in the vehicle. The vehicle in which the in-vehicle system 100 is mounted will also be referred to below as a system-mounted vehicle for the sake of convenience.

The camera 2 is a camera which is mounted in the vehicle and captures an image of a given region outside the vehicle. The camera 2 may be implemented by an optical camera such as a CMOS camera or a CCD camera. In this embodiment, the camera 2 is, as an example, a so-called forward-looking monitoring camera which takes an image of the given region in front of the system-mounted vehicle. The camera 2 may be disposed near an upper end of a windshield, for example, near a rearview mirror. Data on an image captured by the camera 2 is delivered in sequence to the ECU 1. In this embodiment, the camera 2 is implemented by the forward-looking monitoring camera, but may alternatively be implemented by a rearward-looking monitoring camera which takes an image of a rear view of the system-mounted vehicle. The camera 2 corresponds to a vehicle-mounted camera, as recited in claims.

The steering angle sensor 3 senses a steered angle of the system-mounted vehicle and outputs, in sequence, a steered angle signal indicative thereof to the ECU 1. The vehicle speed sensor 4 is a sensor which measures a moving speed of the vehicle and outputs, in sequence, a vehicle speed signal indicative thereof to the ECU 1.

The yaw rate sensor 5 is a sensor which measures an angular velocity (i.e., a yaw rate) of the system-mounted vehicle around a vertical axis of the system-mounted vehicle and outputs, in sequence, a signal indicative of the measure yaw rate to the ECU 1. The vertical direction, as referred to herein, is a direction perpendicular both to the longitudinal and widthwise directions of the vehicle.

The acceleration sensor 6 is a sensor which measures an acceleration acting on the system-mounted vehicle and outputs, in sequence, a signal indicative thereof to the ECU 1. In this embodiment, the acceleration sensor 6 is implemented by a three-axis acceleration sensor which works to measure accelerations in the width-wise direction, the longitudinal direction, and the vertical direction of the vehicle which are perpendicular to each other. The acceleration sensor 6 may alternatively be implemented by a two-axis acceleration sensor which measures accelerations in two axial directions perpendicular to each other or a single axis sensor which measures an acceleration in a single direction.

The position detector 7 works to measure a current position of the system-mounted vehicle using a signal received from a positioning satellite by a receiver used in a GNSS (Global Navigation Satellite System). The position detector 7 may be designed to perform Dead Reckoning which complements a result of detection of the current position of the system-mounted vehicle by using a detected value of the yaw rate sensor 5 or the acceleration sensor 6. The result of detection of the position detector 7, i.e., position information about the current position of the system-mounted vehicle is, in sequence, delivered to the ECU 1 and the navigation device 8. The position information may be represented by degrees of latitude and longitude.

The navigation device 8 has functions similar to known navigation systems. For instance, the navigation device 8 uses the current position, as detected by the position detector 7, and road map data, as stored in a memory device, not shown, to show a map image around the system-mounted vehicle on a display or guide a travel path to a destination set by a user. The navigation device 8 is designed to obtain information about the type of a road on which the system-mounted vehicle is now traveling, the number of lanes on the road, and the configuration (e.g., a curvature or a gradient) of the road using the current position of the system-mounted vehicle and the road map data.

Devices (including sensors) connected to the ECU 1 are not limited to the ones as described above. The ECU 1 may be connected to a shift position sensor which detects a gear shift position in a transmission, a brake pedal sensor which detects a depressed position of a brake pedal, or an accelerator pedal sensor which detects a depressed position of an accelerator pedal.

The ECU 1 is made of a typical computer and includes the CPU 11, the RAM 12 that is a main storage device or memory, the flash memory 13 that is an auxiliary storage device, an I/O, and bus lines connecting them.

The flash memory 13 stores therein programs which operate a typical computer as the ECU 1 in this embodiment. The programs may be stored in a storage device, such as a non-transitory tangible storage media, installed in the ECU 1 other than the flash memory. For example, a ROM may be used.

Figure 2:
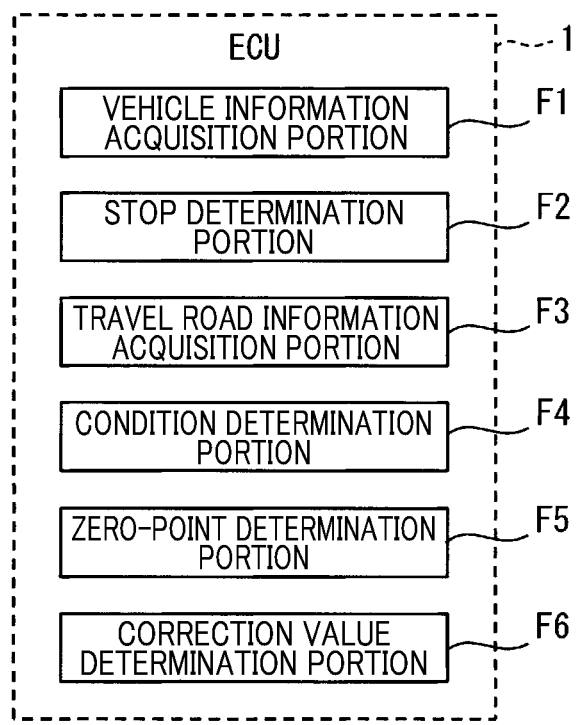
FIG. 2 is a block diagram which shows an example of a schematic structure of an ECU 1.

The ECU 1 is, as illustrated in FIG. 2, equipped with the vehicle information acquisition portion F1, the stop determination portion F2, the travel road information acquisition portion F3, the condition determination portion F4, the zero-point determination portion F5, and the correction value determination portion F6 as functional blocks realized by executing the above programs. Each of the functional blocks may be created by hardware using one or a plurality of IC chips. The execution of the above programs by the CPU is equivalent to execution of a method provided by the above programs.

Figure 3:
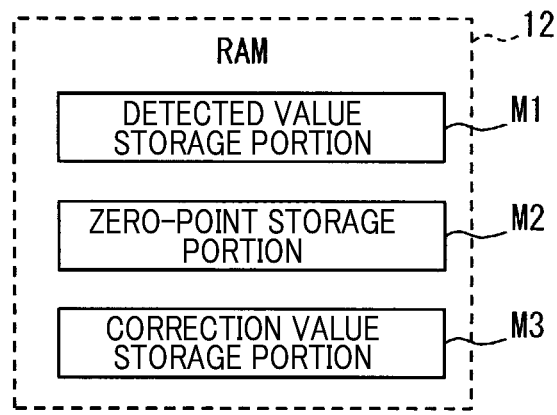
FIG. 3 is a block diagram which shows an example of a schematic structure of a RAM 12.

The RAM 12 uses a portion of a storage area thereof to provide, as illustrated in FIG. 3, the detected value storage portion M1, the zero-point storage portion M2, and the correction value storage portion M3 which will be described later. In this embodiment, the detected value storage portion M1, the zero-point storage portion M2, and the correction value storage portion M3 are achieved by using a portion of the storage area of the RAM 12, but may alternatively be achieved in another way, for example, using a portion of a storage area of the flash memory 13.

The vehicle information acquisition portion F1 obtains a detected value $\theta$ of the steering angle sensor 3, a detected value V of the vehicle speed sensor 4, the detected value Y of the yaw rate sensor 5, and the detected value A of the acceleration sensor. The vehicle information acquisition portion F1 corresponds to a detected value acquisition portion in claims. In the following discussion, information about the above behaviors of the system-mounted vehicle will also be referred to as vehicle information. The kinds of parameters contained in the vehicle information are not limited to the ones, as described above, but may include a gear shift position detected by a shift position sensor, a depressed position of a brake pedal, a depressed position of an accelerator pedal, and/or a connected state of a direction indicator lever.

When the condition determination portion F4, as will be described later, determines that a sampling condition is met, the vehicle information acquisition portion F1 stores, in the detected value storage portion M1, ones of detected values, as produced by some (which will also be referred to as correction target sensors) of the sensors installed in the in-vehicle system 100 which are selected as targets for use in determining or updating correction values for zero-point correction. The above ones of the detected values are selected successive ones of the detected values proceeding the most recent detected value and include the most recent detected value. The number of the detected values stored in the detected value storage portion M1 is more than or equal to N required to calculate the correction values.

The zero-point correction, as referred to herein, is to correct a detected value of the sensor whose zero point has been deviated from a correct zero due to aging of the sensor, temperature characteristics of the sensor, or an initial shift of an output of the sensor to agree with a value where the zero point of the sensor agrees with the correct zero. The zero point of one of the sensors is a value outputted from that sensor in a condition where a physical quantity that is a target to be detected by the sensor does not act on the sensor. The zero point is usually designed to be zero.

A correction value used in the zero-point correction is used to remove an error component, as arising from a deviation of the zero point, from a detected value of the sensor. The correction value is determined to correspond to an amount by which the zero point is deviated from zero (which will also be referred to as a deviation).

The operation of this embodiment in an example where the yaw rate sensor 5 is a target sensor to be corrected will be described below.

The stop determination portion F2 determines whether the system-mounted vehicle is stationary or not using the vehicle information obtained by the vehicle information acquisition portion F1. For example, when the travel speed V of the system-mounted vehicle is less than or equal to a parking threshold value (e.g., 3 km/h), the system-mounted vehicle is determined to be stopped.

Alternatively, when the gear shift position, as derived by the vehicle information acquisition portion F1 as the vehicle information, indicates a parking position, the stop determination portion F2 may determine that the system-mounted vehicle is stopped. Alternatively, when the parking brake is applied, it may be determined that the system-mounted vehicle is stopped.

The stop determination portion F2 also uses a result of the determination of whether the system-mounted vehicle is stationary or not to determine whether the system-mounted vehicle has been switch from a condition where it is stopped (which will also be referred to below as a stopped state) to a condition where it is moving (which will also be referred to as a moving state) or not or whether the system-mounted vehicle has been changed from the moving state to the stopped state or not.

The travel road information acquisition portion F3 obtains travel road information about a road on which the system-mounted vehicle is not moving (which will also be referred to as a travel road). The travel road information includes information about, for example, the curvature C, the gradient, and the width of the road. The travel road information includes at least the curvature C, but may not contain the gradient and the width of the road. The curvature C is defined as the reciprocal of the radius of curvature R [m] (i.e., $C=1/R$). The travel road information acquisition portion F3 corresponds to a curvature determining portion in claims.

The way in which the travel road information acquisition portion F3 obtains the travel road information may be optionally designed. As an example in this embodiment, the travel road information acquisition portion F3 analyzes image data delivered from the camera 2 to detect a lane marking line on the road in front of the system-mounted vehicle and calculates a curvature of the lane marking line as the curvature C of the travel road. The image recognition techniques to extract the lane marking line on the road from the image data and techniques to calculate the curvature of a white line are known, for example, by Japanese Patent First Publication No. 2013-196341, and explanation thereof in detail will be omitted here.

In the case where the ECU 1, as in this embodiment, connects with the navigation device 8, the travel road information acquisition portion F3 may obtain the travel road information from the navigation device 8. The curvature C of the travel road may be calculated using a travel locus defined by a time-sequence of current positions detected by the position detector 7. The curvature C may alternatively be calculated using the above methods in a complementary way or determined in another way.

The condition determination portion F4 uses the vehicle information, as derived by the vehicle information acquisition portion F1, to determine whether a given sampling condition is met or not. The sampling condition is a condition specifying a situation where detected values for use in calculating a value (which will be referred to as a zero-point equivalent value) Yz corresponding to the current zero point of the correction target sensor (i.e., the yaw rate sensor 5 in this embodiment) should be collected. In other words, the sampling condition is a condition where the correction target sensor is expected to be outputting a value corresponding to the current zero point.

In this embodiment, the yaw rate sensor 5 is used as the correction target sensor. The sampling condition is, therefore, a condition where the system-mounted vehicle is expected not to be subjected to the yaw rate. Specifically, the sampling condition includes three conditions (which will also be referred to as sub-conditions) where the travel speed V is higher than or equal to a vehicle speed threshold value Vth, where the steered angle θ is less than a given steering angle threshold value θt, and where the curvature C is less than a given curvature threshold value Cth. When the three sub-conditions are all met, the sampling condition is determined to have been satisfied.

The vehicle speed threshold value Vth, as used herein, represents a lower limit of the travel speed V at which the system-mounted vehicle is viewed as moving. The vehicle speed threshold value Vth may be set identical with the above described the parking threshold value. The steering angle threshold value θth is an upper limit of the steered angle θ at which the system-mounted vehicle is expected to be about to move straight. The curvature threshold value Cth is an upper limit of the curvature C at which the travel road is viewed as being, in other words, approximating a straight path.

Therefore, the situation meeting the above sampling condition is where the system-mounted vehicle is moving on the straight path when the travel speed of the system-mounted vehicle is greater than or equal to the vehicle speed threshold value Vth, and the steered angle θ of the system-mounted vehicle is less than the steering angle threshold value θth. The curvature threshold value Cth corresponds to an approximation threshold value recited in claims.

Figure 4:
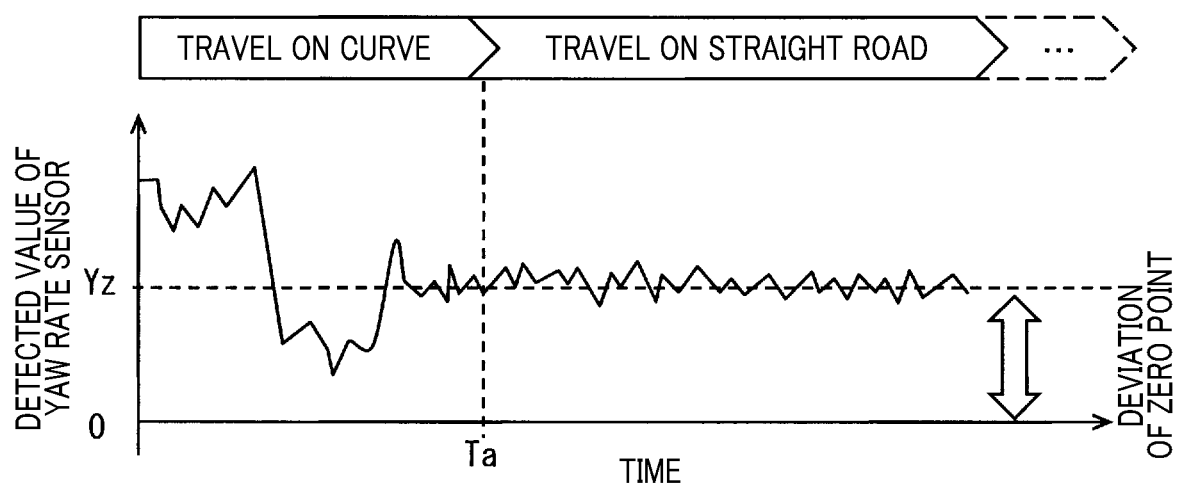
FIG. 4 is a schematic view which represents a relation between a detected value of a yaw rate sensor 5 and behavior of a vehicle.

FIG. 4 is a schematic view which represents a relation between a detected value of the yaw rate sensor 5 and the travel road. The horizontal axis of the graph indicates the time. The vertical axis of the graph indicates a detected value of the yaw rate sensor 5. Time Ta is a time when the system-mounted vehicle has started traveling on the straight path after moving on a curved road. "Yz" represents the current zero-point equivalent value of the yaw rate sensor 5. The zero-point equivalent value Yz corresponds to a deviation of the zero point.

When the system-mounted vehicle is moving on a curved road, it will cause, as illustrated in FIG. 4, the yaw rate to act on the system-mounted vehicle, so that the yaw rate sensor 5 produces an output that is the current zero-point equivalent value Yz plus a value equivalent to the yaw rate. Alternatively, when the system-mounted vehicle is moving straight, the yaw rate hardly acts thereon. The yaw rate sensor 5 is, thus, expected to produce an output close to the current zero point.

In other words, when the sampling condition is met, a detected value outputted from the yaw rate sensor 5 is expected to be at the current zero point of the yaw rate sensor 5. The case where a detected value of the yaw rate sensor 5 is expected to be close to the zero-point is not only when the system-mounted vehicle is traveling on the straight path, but also when the yaw rate sensor 5 is expected to produce an output close to the current zero point when the system-mounted vehicle is stopped.

The zero-point determination portion F5 uses values which have been detected at a plurality of time points by the correction target sensor (i.e., the yaw rate sensor 5) and stored in the detected value storage portion M1 to determine the current zero-point equivalent value Yz of the correction target sensor. Specifically, N detected values which were collected when the sampling conditions was being satisfied are extracted from the detected value storage portion M1 as a population for use in determining the current zero-point equivalent value Yz of the yaw rate sensor 5. An average value of the population is then defined as the zero-point equivalent value Yz of the correction target sensor. The zero-point equivalent value Yz, as determined by the zero-point determination portion F5, is saved in the zero-point storage portion M2.

Instead of the average value of the detected values making up the population (which will also be referred to below as a specifying population) for use in calculating the correction value Q, the zero-point determination portion F5 may alternatively define the middle of the detected values of the specifying population which are arranged from the smallest to the greatest as the zero-point equivalent value Yz. Alternatively, the mode that appears most often among the specifying population may be defined as the zero-point equivalent value Yz. Various representative values used in statistics may be employed as the zero-point equivalent value Yz as well as the averaged value.

The correction value determination portion F6 calculates the correction value Q based on the zero-point equivalent value Yz determined by the zero-point determination portion F5. In this embodiment, the zero-point equivalent value Yz, as derived by the zero-point determination portion F5, is used as the correction value Q and saved in the correction value storage portion M3. Subsequently, the ECU 1 subtracts the correction value Q from the detected value Y to derive a value Yq (i.e., a corrected detected value) and use it in various control operations.

The correction value Q is, as described above, the zero-point equivalent value Yz of the yaw rate sensor 5, that is, a value equivalent to a deviation of the zero point thereof. The corrected detected value Yq, as derived by subtracting the correction value Q from the detected value Y, will, therefore, represents a value the yaw rate sensor 5 properly detects, in other words, a yaw rate actually acting on the system-mounted vehicle.

Figure 5:
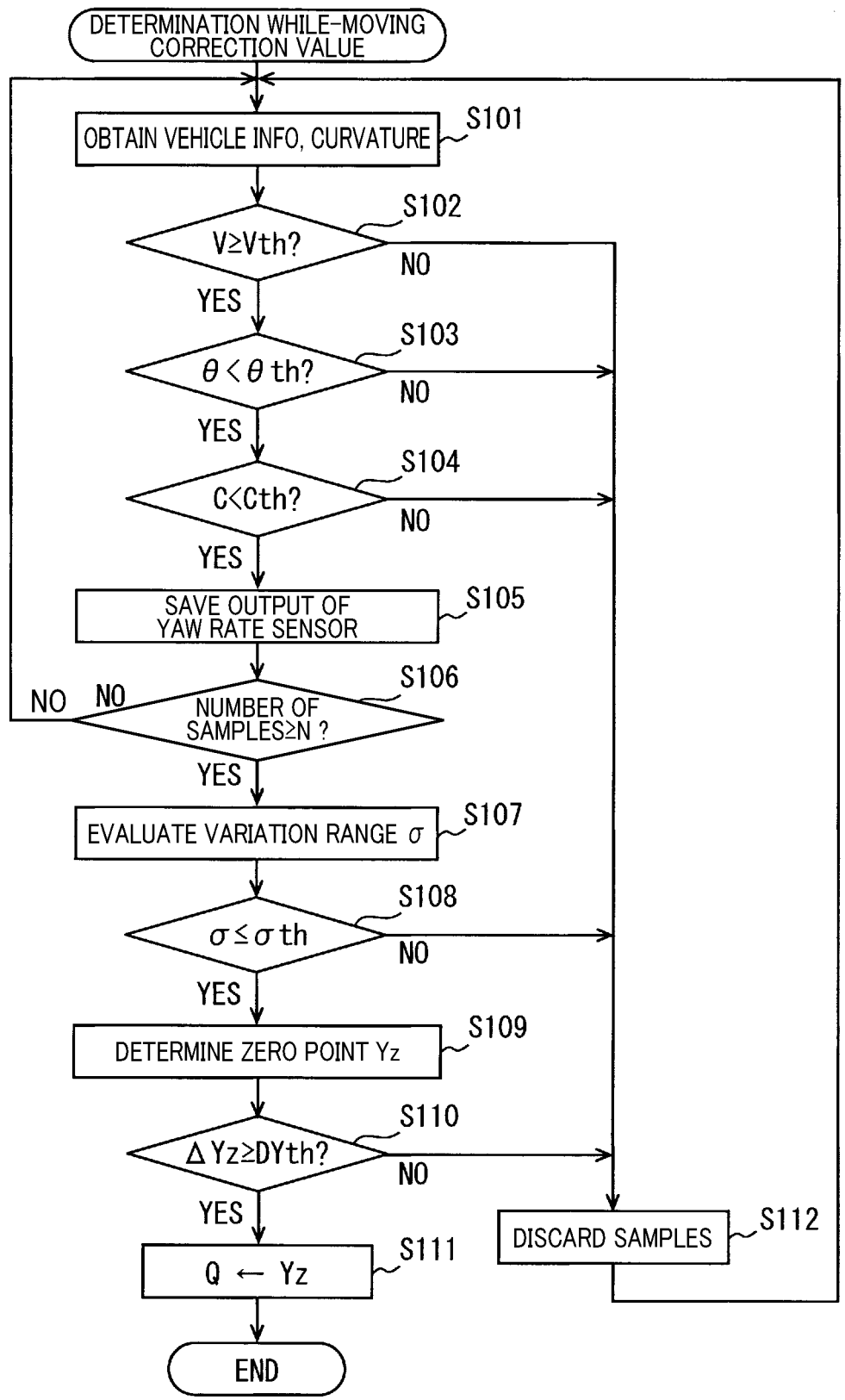
FIG. 5 is a flowchart of an in-motion correction value determining operation executed by an ECU 1 in the first embodiment.

Next, a process (which will also be referred to below as an in-motion correction value determining operation) by the ECU 1 to determine the correction value Q for the yaw rate sensor 5 using a value detected by the yaw rate sensor 5 when the system-mounted vehicle is moving will be described with using a flowchart of FIG. 5. The flowchart in FIG. 5 is initiated when an ignition power supply is turned on. When the in-motion correction value determining operation is properly terminated while the ignition power supply is in the on-state, it is executed again. In other words, the in-motion correction value determining operation is executed in cycle as long as the ignition power supply is in the on-state.

First in step S101 of FIG. 5, the vehicle information acquisition portion F1 acquires the vehicle information. The travel road information acquisition portion F3 derives the curvature C of the travel road. The routine proceeds to step S102 wherein the condition determination portion F4 determines whether the travel speed V is greater than or equal to the vehicle speed threshold value Vth or not. If a YES answer is obtained meaning that the travel speed V is greater than or equal to the vehicle speed threshold value Vth, then the routine proceeds to step S103. Alternatively, if a NO answer is obtained meaning that the travel speed V is less than the vehicle speed threshold value Vth, then the routine proceeds to step S112.

In step S103, the condition determination portion F4 determines whether the steered angle θ is less than the steering angle threshold value θth or not. If a YES answer is obtained meaning that the steered angle θ is less than the steering angle threshold value θth, then the routine proceeds to step S104. Alternatively, if a NO answer is obtained meaning that the steered angle θ is greater than or equal to the steering angle threshold value θth, then the routine proceeds to step S112.

In step S104, the condition determination portion F4 determines whether the curvature C is less than the curvature threshold value Cth or not. If a YES answer is obtained meaning that the curvature C is less than the curvature threshold value Cth, then the routine proceeds to step s105. Alternatively, if a NO answer is obtained meaning that the curvature C is greater than or equal to the curvature threshold value Cth, then the routine proceeds to step S112. Steps S102 to S104 are a sequence of operations in which the condition determination portion F4 determines whether the sampling condition is met or not. In brief, the fact that a YES answer is obtained in step S104, so that the routine proceeds to step S105 means that the sampling condition is satisfied.

In step S105, the vehicle information acquisition portion F1 saves a detected value of the yaw rate sensor 5, as derived in step S101, in the detected value storage portion M1. The routine then proceeds to step S106 wherein the zero-point determination portion F5 determines whether the number of the detected values, as saved in the detected value storage portion M1, is greater than or equal to N or not. If a YES answer is obtained meaning that the number of the detected values saved in the detected value storage portion M1 is greater than or equal to N, then the routine proceeds to step S107. Alternatively, of a NO answer is obtained meaning that the number of the detected values saved in the detected value storage portion M1 is less than N, then the routine returns back to step S101 to continue to collect a detected value of the yaw rate sensor 5.

In step S107, the zero-point determination portion F5 reads N latest detected values out of the detected value storage portion M1 in the form of a population (i.e., the specifying population) for use in determining the current zero-point equivalent value Yz of the yaw rate sensor 5. The zero-point determination portion F5 calculates a range a of a variation in the specifying population. The range a, as referred to herein, is an index for use in determining whether detected values of the yaw rate sensor 5 were stable or not when they were being sampled for determining the current zero-point equivalent value Yz of the yaw rate sensor 5.

Here, the range σ is, as an example, given by an absolute value of a difference between a minimum and a maximum value among the detected values in the specifying population, but not limited thereto. The range σ may alternatively be defined by a dispersion or a standard deviation of the specifying population. The range σ corresponds to a degree of variation recited in claims. After steps 107, the routine proceeds to step S108.

In step S108, the zero-point determination portion F5 determines whether the range σ is less than or equal to a given range threshold value σth or not. If a YES answer is obtained meaning that the range σ is less than or equal to the range threshold value σth, then the routine proceeds to step S109. Alternatively, if a NO answer is obtained meaning that the range σ is greater than or equal to the range threshold value σth, then the routine proceeds to step S112.

The range threshold value σth, as used herein, is a threshold value for determining whether a variation in detected values of the yaw rate sensor 5 sampled for determining the current zero-point equivalent value Yz of the yaw rate sensor 5 lies in a given permissible range or not. When the behavior of the yaw rate sensor 5 was stable while the detected values of the yaw rate sensor 5 were being sampled for determining the current zero-point equivalent value Yz of the yaw rate sensor, the range σ will be less than or equal to the range threshold value σth. This determination is included in the in-motion correction value determining operation, thereby achieving accurate determination of the current zero-point equivalent value Yz.

In step S109, the zero-point determination portion F5 calculates an averaged value in the specifying population and then defines it as the current zero-point equivalent value Yz of the yaw rate sensor 5. The routine then proceeds to step S110.

In step S110, the correction value determination portion F6 calculates a zero-point deviation Δ Yz that is an absolute value of a difference between the zero-point equivalent value Yz, as saved in the correction value storage portion M3 and used in determining the correction value Q employed so far, and the zero-point equivalent value Yz determined newly in this operation cycle.

The correction value determination portion F6 then determines whether the zero-point deviation Δ Yz is greater than or equal to a given deviation threshold value DYth or not. If a YES answer is obtained meaning that the zero-point deviation Δ Yz is greater than or equal to the deviation threshold value DYth, then the routine proceeds to step S111. In this time, the zero-point equivalent value Yz, as newly derived in this operation cycle, is saved in the zero-point storage portion M2 as a zero-point equivalent value for use in calculating the correction value Q. Alternatively, if a NO answer is obtained meaning that the zero-point deviation ΔYz is less than the deviation threshold value DYth, then the routine proceeds to step 112. The deviation threshold value DYth corresponds to an upper limit of an error range, as recited in claims. A lower limit of the error range, as recited in claim 1, is zero.

In step S111, the zero-point equivalent value Yz, as determined in step S109, is defined as the correction value Q for the yaw rate sensor 5. The routine then terminates. In step S112, the detected values, as saved in the detected value storage portion M1 for use in determining the zero-point equivalent value Yz, are discarded.

Summary of First Embodiment

With the above arrangements, when having acquired N detected values of the yaw rate sensor 5 while the sampling condition is being satisfied (i.e., YES in step S106), the ECU 1 uses the N detected values to update the correction value Q as corresponding to the current zero-point equivalent value Yz. It is, thus, possible to update the correction value Q while the system-mounted vehicle is moving. The fact that the sampling condition is met means that the system-mounted vehicle is moving on the straight road, the travel speed is higher than or equal to the vehicle speed threshold value Vth, and the steered angle θ is less than the steering angle threshold value θth.

As an alternative to calculate the correction value (which will also be referred to below as a first comparative mode), it is possible to calculate or update the correction value using the detected values sampled when the system-mounted vehicle is stopped. The deviation of the zero point usually depends upon the ambient temperature of the yaw rate sensor 5. The updating of the correction value using the detected values sampled when the system-mounted vehicle is stopped may, therefore, cause the correction value, as calculated when the system-mounted vehicle is stopped, to differ from an actual deviation with an increase in period of time in which the moving state continues (i.e., a vehicle-moving duration).

The in-vehicle system 100, as described above, is capable of updating the correction value Q while the system-mounted vehicle is moving, thereby minimizing the above described risk that the correction value Q for use in the zero-point correction differs from an actual deviation of the zero point.

As an alternative to calculate the correction value for the yaw rate sensor while the system-mounted vehicle is moving (which will also be referred to below as a second comparative mode), it is possible to have a plurality of yaw rate sensors installed in the system-mounted vehicle and calculate a correction value for a target one of the yaw rate sensors using detected values of other yaw rate sensors (which will also be referred to below as a comparative sensor).

The above way needs for installation of a plurality of yaw rate sensors 5 in the system-mounted vehicle, which results in an increase in production cost. When the detected values of the comparative sensors contain an error arising from a drift of the zero point, it will cause the correction value, as calculated for the correction target sensor, to contain an error.

The in-vehicle system 100 does not need to be equipped with a plurality of yaw rate sensor 5. The in-vehicle system 100 of this embodiment is also designed to calculate the correction value Q for the yaw rate sensor 5 using only a value detected by the yaw rate sensor 5 in itself. The structure of the in-vehicle system 100, therefore, does not encounter the above drawback that errors in the detected values of the comparative sensors adversely impinges on the correction value for the correction target sensor.

As a comparative mode similar to the second comparative mode (which will also be referred to below as a third comparative mode), it is possible to determine the correction value for the yaw rate sensor 5 using a detected value of another three-axis acceleration sensor, such as a gyroscope sensor, measuring a physical quantity which may be used in calculating a yaw rate acting on the system-mounted vehicle. This mode needs not be equipped with a plurality of yaw rate sensors, but however, when the detected value of the gyroscope sensor or the three-axis acceleration sensor that is the comparative sensor contains an error, like in the second comparative mode, it will cause the correction value, as calculated for the yaw rate sensor 5, to contain an error.

As compared with the third comparative mode, the in-vehicle system 100 of this embodiment has the advantage that there is no risk that an error contained a detected value of the comparative sensor adversely impinges on the correction value.

While the present invention has been disclosed in terms of the preferred embodiment, it should be appreciated that the invention is not limited to the above embodiment, but can be embodied in various ways without departing from the principle of the invention. Therefore, the invention should be understood to include all possible embodiments and modifications, as will be described later, to the shown embodiment which can be embodied without departing from the principle of the invention as set forth in the appended claims.

Modification of the First Embodiment

The ECU 1 described in the first embodiment may be designed to execute an operation (which will also be referred to as a stopped-vehicle correction value determining operation) to determine the correction value for the yaw rate sensor 5 using a detected value of the yaw rate sensor 5 when the system-mounted vehicle is stopped. This is because the detected value when the system-mounted vehicle is stationary is expected to correspond to the current zero point. The stopped-vehicle correction value determining operation will be described below using a flowchart of FIG. 6.

Figure 6:
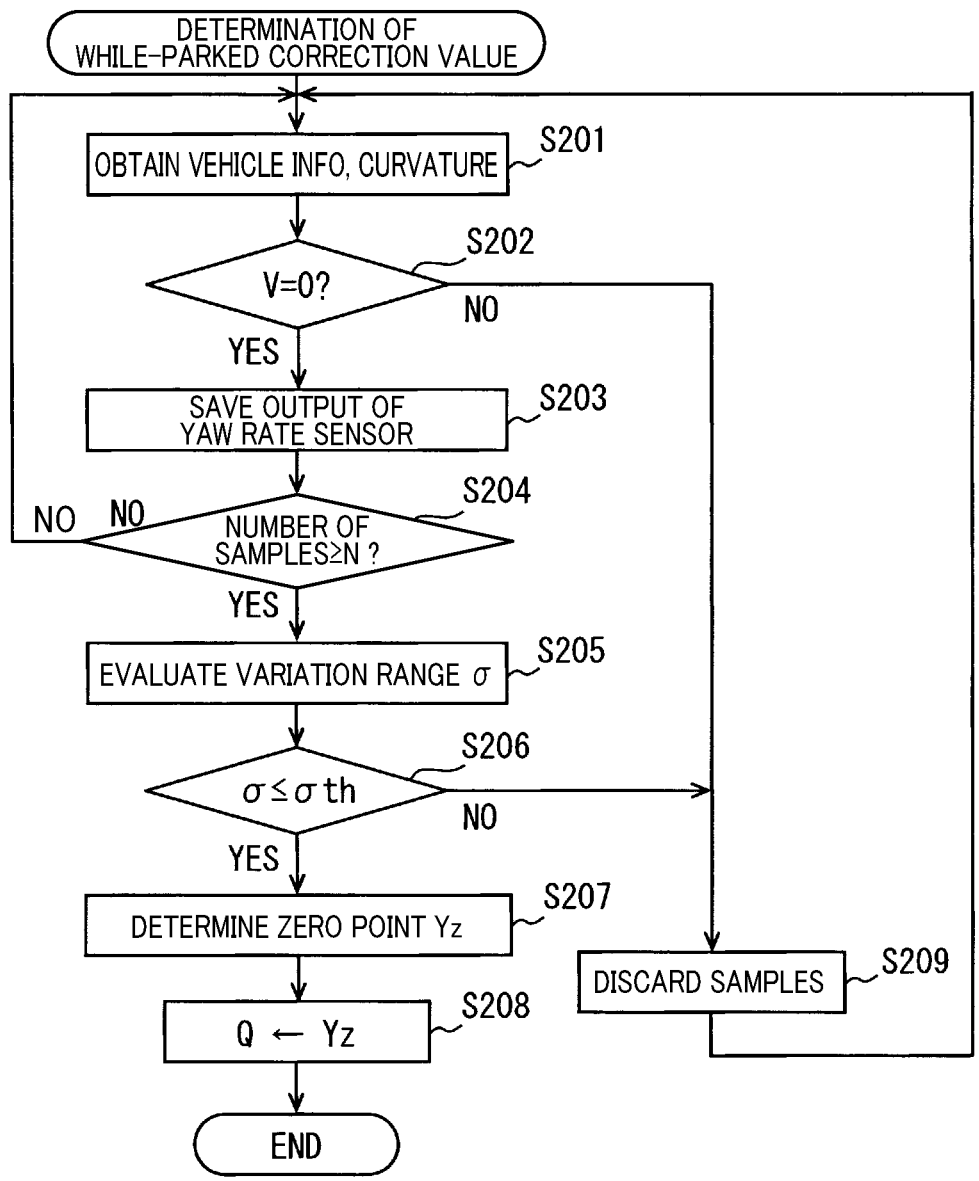
FIG. 6 is a flowchart of a stopped-vehicle correction value determining operation executed by an ECU 1 in a modification of the first embodiment.

The flowchart of FIG. 6 may be initiated when, for example, the ignition power supply is turned on to actuate the ECU 1, and the stop determination portion F2 determines that the system-mounted vehicle has been changed to the stopped-state following the moving state. The stopped-vehicle correction value determining operation and the above described in-motion correction value determining operation may be executed in parallel, i.e., independently from each other.

First, in step S201, the vehicle information acquisition portion F1 obtains the vehicle information. The travel road information acquisition portion F3 derives the curvature C of the travel road. The routine then proceeds to step S202 wherein the condition determination portion F4 compares between the current travel speed V and the vehicle speed threshold value Vth to determine whether the travel speed V is higher than or equal to the vehicle speed threshold value Vth or not. If a YES answer is obtained meaning that the travel speed V is higher than or equal to the vehicle speed threshold value Vth, then the routine proceeds to step S203. Alternatively, if a NO answer is obtained meaning that the travel speed V is less than the vehicle speed threshold value Vth, then the routine proceeds to step 209.

In step S203, the vehicle information acquisition portion F1 saves the detected value Y of the yaw rate sensor 5, as derived in step S201, in the detected value storage portion M1. The routine then proceeds to step S204. The detected values, as derived in the stopped-vehicle correction value determining operation, and the detected values, as derived in the in-motion correction value determining operation may be distinctively saved in the detected value storage portion M1.

In step S204, the zero-point determination portion F5 determines whether the number of the detected values, as saved in the detected value storage portion M1 while the system-mounted vehicle is stopped, has become greater than or equal to N or not. If a YES answer is obtained meaning that the number of the detected values saved in the detected value storage portion M1 is greater than or equal to N, then the routine proceeds to step S205. Alternatively, if a NO answer is obtained meaning that the number of the detected values saved in the detected value storage portion M1 is less than N, then the routine returns back to step S201 to continue to sample a detected value of the yaw rate sensor 5.

In step S205, the zero-point determination portion F5 reads N latest detected values, as sampled while the system-mounted vehicle was stopped, out of the detected value storage portion M1 in the form of the specifying population. The zero-point determination portion F5 calculates the range σ of a variation in the specifying population. After completion of the operation in FIG. 205, the routine proceeds to step S206.

In step S206, the zero-point determination portion F5 compares between the range σ and the range threshold value σth. If a YES answer is obtained in step S206 meaning that the range σ is less than or equal to the range threshold value σth, then the routine proceeds to step S207. Alternatively, if a NO answer is obtained in step S206 meaning that the range σ is greater than the range threshold value σth, then the routine proceeds to step S209.

In step S207, the zero-point determination portion F5 calculates an averaged value in the specifying population. The averaged value is used as the current zero-point equivalent value Yz of the yaw rate sensor 5. The routine proceeds to step S208.

In step S208, the correction value determination portion F6 defines the zero-point equivalent value Yz, as determined in step S207, as the correction value Q for the yaw rate sensor 5. The zero-point equivalent value Yz, as determined in this operation cycle, is saved in the zero-point storage portion M2 as being used in calculating the correction value Q. The routine then terminates. In step S209, the detected values, as saved in the detected value storage portion M1 which were sampled when the system-mounted vehicle was stopped, are discarded. The routine then returns back to step S201.

With the above arrangements, is it possible to update the correction value Q for the yaw rate sensor 5 when the system-mounted vehicle is stopped as well as when the system-mounted vehicle is moving. Usually, when the system-mounted vehicle is in the stopped-state, detected values of the yaw rate sensor 5 are stable as compared with when it is in the moving state. Additionally, there is a lower probability in the stopped-state that the yaw rate acts on the system-mounted vehicle. The zero-point equivalent value Yz, as derived using the detected value sampled in the stopped-state, has a higher degree of reliability than that in the moving state. Accordingly, this modification is capable of minimizing a risk that the correction value Q for use in the zero-point correction differs from a deviation of the current zero point.

The stopped-vehicle correction value determining operation of this modification omits the decision operation in step S110 in the in-motion correction value determining operation. Therefore, even when a difference between the zero-point equivalent value Yz which were saved in the correction value storage portion M3 and used so far in calculating the latest correction value and that newly determined in this operation cycle is small, the correction value Q is updated to have a value corresponding to the zero-point equivalent value Yz newly determined in this operation cycle.

As described above, the zero-point equivalent value Yz, as derived using the detected value sampled in the stopped-state, has a higher degree of reliability than that in the moving state. The omission of the decision operation of step S110 in the in-motion correction value determining operation, therefore, enables the ECU 1 to adequately update the correction value Q and use it in various arithmetic operations.

Second Embodiment

The second embodiment of the invention will be described below using the drawings. In the following discussion, the same reference numbers, as employed in the first embodiment (and the modification thereof), will refer to parts having functions similar to those in the first embodiment, and explanation thereof in detail will be omitted here. When the following discussion refer to only portions of the parts, the explanation in the first embodiment (and the modification thereof) apply to other portions of the parts.

A major feature in the second embodiment which is different from those in the first embodiment and the modification of the first embodiment is that the zero-point determination portion F5 weights and adds the zero-point equivalent value Yz, as newly determined, and the correction value now being used using a given weight a ($\leq a \leq 1$) to update the correction value Q. If the correction value, as now being used, is defined as Qa, the correction value Q which will be newly calculated in this operation cycle is given by the following equation.

$$Q = Qa \times (1-a) + Yz \times a \quad \text{Eq. 1}$$

Figure 7:
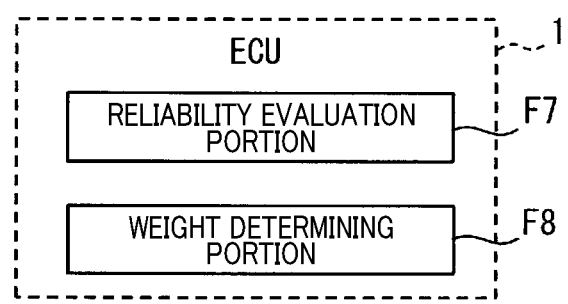
FIG. 7 is a block diagram for explaining functions installed in an ECU 1 in the second embodiment.

The ECU 1 in the second embodiment also includes, as illustrated in FIG. 7, a reliability evaluation portion F7 and a weight determining portion F8 in the form of functional blocks as well as the functional blocks installed in the ECU 1 of the first embodiment. FIG. 7 omits the functional blocks already discussed in the first embodiment.

The reliability evaluation portion F7 works to evaluate the degree of reliability of the zero-point equivalent value Yz newly determined by the zero-point determination portion F5. The weight determining portion F8 determines the weight a which is used by the zero-point determination portion F5 in weight-adding the zero-point equivalent value Yz, as newly determined, and the correction value Q, as now being used, to each other. The weight a is, as clearly shown in the above Eq. 1, a coefficient of the zero-point equivalent value Yz newly determined. The greater the weight a (as closer to one), the greater the degree of contribution of the zero-point equivalent value Yz, as having been newly determined, to the correction value Q which will be newly calculated. The reliability evaluation portion F7 and the weight determining portion F8 will be described later in detail.

The reliability evaluation portion F7 and the weight determining portion F8 are realized in the form of software by a CPU in this embodiment, but may alternatively be created in the form of hardware using one or a plurality of ICs.

Next, an operation of the ECU 1 in the second embodiment (which will also be referred to as a correction value determining operation) to determine the correction value Q for the yaw rate sensor 5 will be described below using FIG. 8. The correction value determining operation may be initiated upon turning on of the ignition power supply. When having properly completed while the ignition power supply is in the on-state, the in-motion correction value determining operation is retrieved and executed again. In other words, the in-motion correction value determining operation is performed in cycle as long as the ignition power supply is in the on-state.

First, in step S301, the stop determination portion F2 determines whether the system-mounted vehicle is at rest or not. If a YES answer is obtained meaning that the system-mounted vehicle is in the stopped-state, then the routine proceeds to step S310. Alternatively, if a NO answer is obtained meaning that the system-mounted vehicle is in the moving state, then the routine proceeds to step S320.

In step S310, parts of the ECU 1, particularly, the vehicle information acquisition portion F1, the stop determination portion F2, the condition determination portion F4, and the zero-point determination portion F5 execute in cooperation a while-stationary sampling operation. The while-stationary sampling operation is to sample a detected value of the yaw rate sensor 5 N times when the system-mounted vehicle is in the stopped-state. Specifically, the while-stationary sampling operation is achieved by a sequence of steps S201 to S206 including step S209 in FIG. 6.

Figure 8:
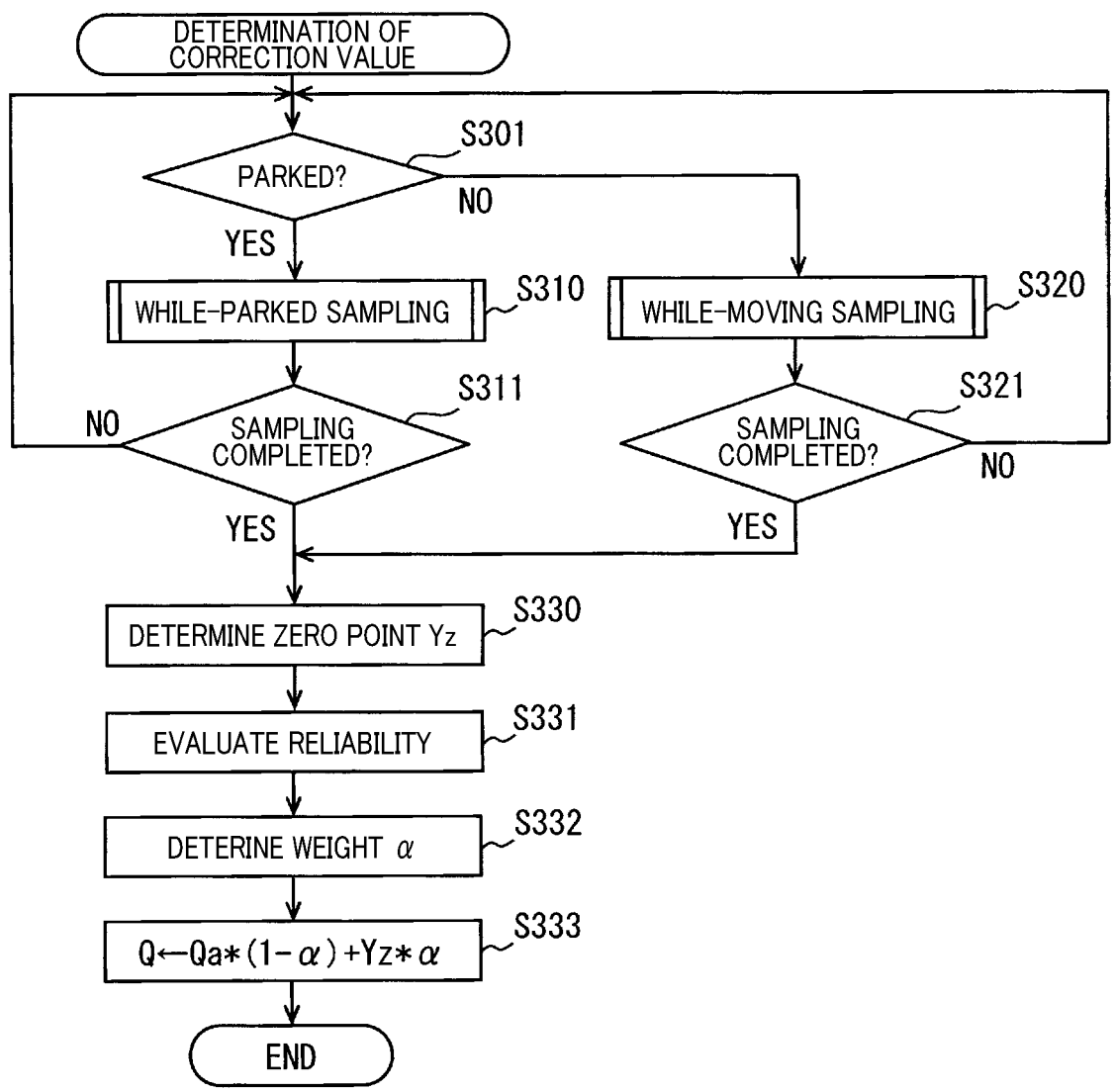
FIG. 8 is a flowchart of a correction value determining operation executed by an ECU 1 in the second embodiment.

If, for example, the system-mounted vehicle has changed to the moving state during the while-stationary sampling operation in step S310 (e.g., NO in step S202), a NO answer is obtained in step S311 in FIG. 8. The routine then returns back to step S301. Alternatively, if the while-stationary sampling operation in step S310 has achieved success in sampling N detected values where the range σ is less than the range threshold value σth, a YES answer is obtained in step S311. The routine then proceeds to step S330.

In step S320, parts of the ECU 1, particularly, the vehicle information acquisition portion F1, the stop determination portion F2, the condition determination portion F4, and the zero-point determination portion F5 execute in cooperation an in-motion sampling operation. The in-motion sampling operation is to sample a detected value of the yaw rate sensor 5 N times when the system-mounted vehicle is in the moving state. Specifically, the in-motion sampling operation is achieved by a sequence of steps S101 to S108 including step S112 in FIG. 5.

If, for example, the system-mounted vehicle has changed to the stopped-state during the in-motion sampling operation in step S320, a NO answer is obtained in step S321 in FIG. 8. The routine then returns back to step S301. Alternatively, if the in-motion sampling operation in step S320 has achieved success in sampling N detected values where the range σ is less than the range threshold value σth, a YES answer is obtained in step S321. The routine then proceeds to step S330.

In step S330, the zero-point determination portion F5 defines the detected values, as sampled in the while-stationary sampling operation or the in-motion sampling operation, as the specifying population to determine the current zero-point equivalent value Yz. The routine then proceeds to step S331. In the following discussion, the zero-point equivalent value Yz derived in step S330 will also be referred to below as a newly-determined value Yz.

In step S331, the reliability evaluation portion F7 evaluates the degree of reliability of the newly determined value Yz determined in step S330. Specifically, when the newly determined value Yz is given by the zero-point equivalent value derived by the population of the detected values sampled when the system-mounted vehicle is stopped, the reliability evaluation portion F7 determines that the newly determined value Yz has a higher degree of reliability than that given by the zero-point equivalent value derived by population of the detected values sampled when the system-mounted vehicle is moving.

When the newly determined value Yz has been derived by the population of the detected values sampled when the system-mounted vehicle is stopped, and it is also expected to have been derived in a situation where the system-mounted vehicle was obviously viewed as being stationary, the reliability evaluation portion F7 may set the degree of reliability of the newly determined value Yz higher than that derived by the population of the detected values sampled when the system-mounted vehicle is determined as being stopped using only the travel speed V. The situation where the system-mounted vehicle is obviously expected to be stopped is, for example, a situation immediately after the ignition power supply is turned on or the shift position is a parked position.

The degree of reliability of the newly determined value Yz derived by the population of the detected values sampled when the system-mounted vehicle is moving may be evaluated in a stepwise fashion. Specifically, the longer a range (which will also be referred to below as a recognizable range) wherein it is possible to perceive a lane boundary line in front of the system-mounted vehicle using image recognition processing, the higher the degree of reliability of the newly determined value Yz is set. Conversely, the shorter the recognizable range, the lower the degree of reliability is set.

The above is because the loner the recognizable range, the higher the degree of reliability of the curvature C (which will also be referred to below as a degree of curvature reliability), as calculated through the image recognition, will be. The fact that the degree of curvature reliability is higher represents a higher degree of reliability of a determination (i.e., YES in step S104) that the system-mounted vehicle is moving on a straight path.

The higher degree of reliability of the determination that the system-mounted vehicle is moving on the straight path represents a higher probability that detected values of the yaw rate sensor 5, as sampled when the system-mounted vehicle is moving, absolutely corresponds to the current zero point. Therefore, the higher the probability that the detected values of the yaw rate sensor 5, as sampled when the system-mounted vehicle is moving, are values corresponding to the zero point, the higher the degree of reliability of the newly determined value Yz determined using the sampled detected values will be. In other words, the longer the recognizable range of the lane boundary line when a determination that the curvature C is less than or equal to the curvature threshold value continues to be made, the higher the degree of reliability of the newly determined value Yz will be.

For the above reasons, the reliability evaluation portion F7 may evaluate the degree of reliability of the newly determined value Yz as a function of the condition where the specifying population was sampled in a way described below. The following is an example for describing ranked degrees of reliability allocated to the newly determined value Yz. Numerical numbers of the ranked degrees of reliability are not limited to those as shown below. The degree of reliability may be expressed not only by the numeric values, but also by levels, such as a higher, a middle, and a lower level. In the following example, the greater the numeral number, the higher the degree of reliability.

When the newly determined value Yz is calculated using the detected values sampled in a situation where the system-mounted vehicle is obviously expected to be stationary, the degree of reliability is set to 100%. When the newly determined value Yz is calculated using the detected values sampled when the system-mounted vehicle is determined as being stopped only using the travel speed V, the degree of reliability is set to 80%.

When the newly determined value Yz is determined using the detected values sampled when the system-mounted vehicle is moving, and the recognizable range is greater than a given value, the degree of reliability is set to 60%. When the newly determined value Yz is determined using the detected values sampled when the system-mounted vehicle is moving, and the recognizable range is less than the given value, the degree of reliability is set to 40%.

How to evaluate the degree of reliability of the newly determined value Yz is not limited to the above way. For example, the degree of reliability of the newly determined value Yz may be increased with an increase in time interval between when the correction value was updated previously and when the newly determined value Yz was determined in this operation cycle. The above example is where the degree of reliability as a function of the recognizable range is evaluated with two levels, but may alternatively use three or four levels. In either case, the degree of reliability of the newly determined value Yz determined to be increased with an increase in the recognizable range. After the degree of reliability of the newly determined value Yz is evaluated in the above way, the routine proceeds to step S332.

In step S332, the weight determining portion F8 determines the weight a as a function of the degree of reliability of the newly determined value Yz derived in step S330. Specifically, the weight a is increased to one that is an upper limit with an increase in degree of reliability of the newly determined value Yz. After the weight a is calculated, the routine proceeds to step S333.

In step S333, the correction value determination portion F6 substitutes the weight a derived in step S332, the newly determined value Yz, and the correction value Qa now used into Eq. 1, as described above, to newly derive the correction value Q. The routine then terminates.

The second embodiment is capable of updating the correction value Q as a function of the degree of reliability of the zero-point equivalent value Yz, as newly determined. Specifically, when the newly determined value Yz is calculated using the detected value sampled when the system-mounted vehicle is stopped, the weight a is increased, so that the newly determined correction value Q will be a value on which the newly determined value Yz is strongly reflected.

Additionally, when the newly determined value Yz is determined using the detected value sampled when the system-mounted vehicle is moving, and the recognizable range of the lane boundary line while the detected value are being sampled increases, the weight a of the newly determined value Yz is determined to be increased. This causes the degree to which the newly determined value Yz contributes to the calculation of the correction value Q to be increased with an increase in the recognizable range of the lane boundary line while the detected values are being sampled.

Third Embodiment

A major feature in the third embodiment which is different from those in the first embodiment and the modification of the first embodiment is that the zero-point equivalent value Yz, as most recently determined using the detected values sampled when the system-mounted vehicle is parked or stopped (which will also be referred to below as a while-stationary determined value Yzstp), and the zero-point equivalent value Yz, as most recently determined using the detected values sampled while the system-mounted vehicle is moving (which will also be referred to as an in-motion determined value Yzrun), are added to each other using a given weight $\beta(T)$ ($0 \leq \beta \leq 1$) to newly derive the correction value Q. Specifically, the correction value Q is given by Eq 2 below.

$$Q = Yzstp \times \beta(T) + Yzrun \times \{1 - \beta(T)\} \qquad \text{Eq. 2}$$

The weight $\beta(T)$ is determined as a function of a time T elapsed since the while-stationary determined value Yzstp was obtained. Specifically, the shorter the time T elapsed since the while-stationary determined value Yzstp was derived, the greater the weight $\beta(T)$ is set (i.e., to one). Conversely, the longer the time T elapsed since the while-stationary determined value Yzstp was derived, the smaller the weight $\beta(T)$ is set.

Figure 9:
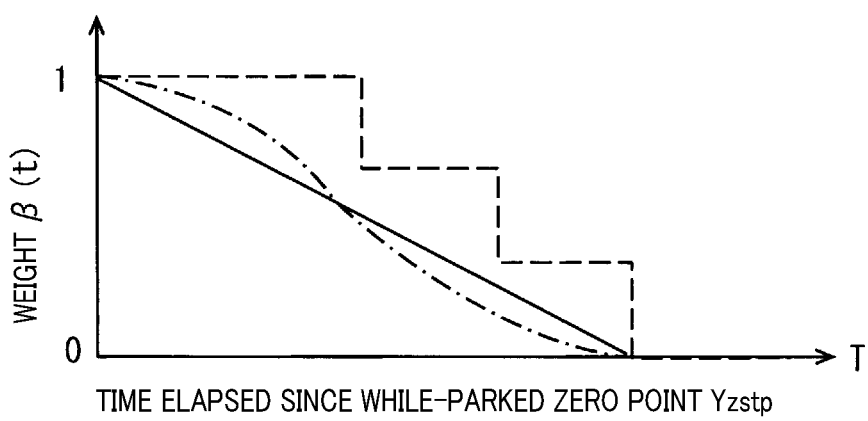
FIG. 9 is a schematic view for explaining a weight $\beta(T)$ used in the third embodiment.

As an example shown by a solid line in FIG. 9, the weight $\beta(T)$ is determined to be decreased from one that is an initial value in proportion to the elapsed time T. The weight $\beta(T)$ may alternatively be, as indicated by a broken line in FIG. 9, determined to be decreased stepwise or, as indicated by an alternate long and short dash line in FIG. 9, in the form of a curved line. The initial value of the weight $\beta(T)$ is selected to be 1, but may alternatively be 0.9. The value on which the weight $\beta(T)$ is converged is set to 0, but may alternatively be 0.1.

The weight $\beta(T)$ may also be calculated by a function in which the time T elapsed since the while-stationary determined value Yzstp was derived is selected as a variable or by look-up using a table which represents a correspondence relation between the elapsed time T and the weight $\beta(T)$. The value of the weight $\beta(T)$ may be updated by the correction value determination portion F6.

Figure 10:
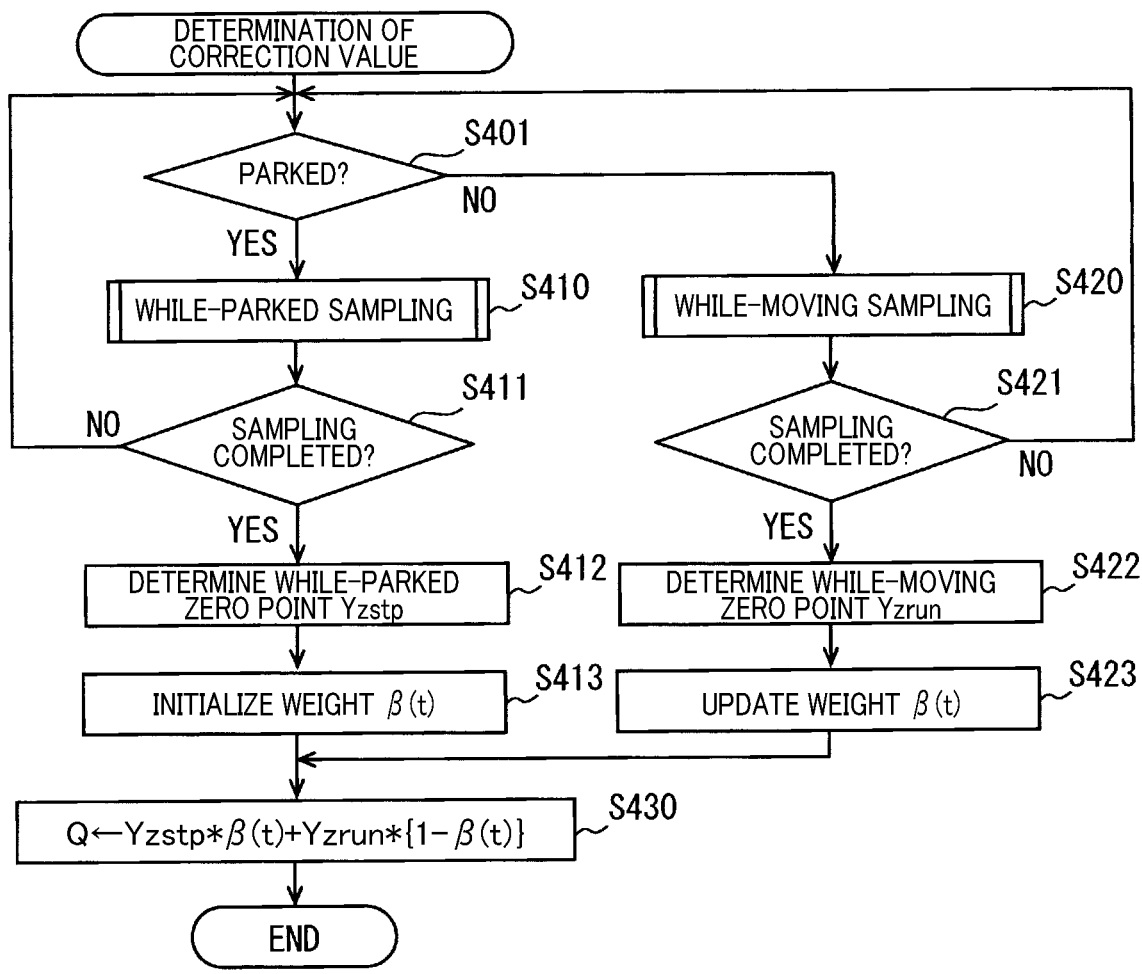
FIG. 10 is a flowchart of a correction value determining operation executed by an ECU 1 in the third embodiment.

The correction value determining operation executed by the ECU 1 in the third embodiment will be described below using FIG. 10. The correction value determining operation may be, like in the second embodiment, initiated when the ignition power supply is turned on. When having properly completed while the ignition power supply is in the on-state, the in-motion correction value determining operation is retrieved and executed again.

In step S401, the stop determination portion F2 determines whether the system-mounted vehicle is stationary or not. If a YES answer is obtained meaning that the system-mounted vehicle is in the stopped-state, then the routine proceeds to step S410. Alternatively, if a NO answer is obtained meaning that the system-mounted vehicle is in the moving state, then the routine proceeds to step S420.

In step S410, the while-stationary sampling operation is executed in the same way as in step S310. Specifically, the while-stationary sampling operation is achieved by a sequence of steps S201 to S206 including step S209 in FIG. 6. If, for example, the system-mounted vehicle has changed to the moving state during the while-stationary sampling operation (e.g., NO in step S202), a NO answer is obtained in step S411 in FIG. 10. The routine then returns back to step S401. Alternatively, if the while-stationary sampling operation in step S410 has achieved success in sampling N detected values where the range $\sigma$ is less than the range threshold value $\sigma$th, a YES answer is obtained in step S411. The routine then proceeds to step S412.

In step S412, the zero-point determination portion F5 defines the detected values, as sampled in the while-stationary sampling operation, in the form of the specifying population and determines the current zero-point equivalent value Yz. The routine then proceeds to step S413. The zero-point equivalent value Yz, as derived in step S412, corresponds to the while-stationary determined value Yzstp. The while-stationary determined value Yzstp is then saved in the zero-point storage portion M2 in relation to a time when the while-stationary determined value Yzstp was derived.

In step S413, the time T elapsed since the while-stationary determined value Yzstp was derived is reset to zero. The weight $\beta(T)$ is initialized to a value defined in relation to the time T=0. The routine then proceeds to step S430.

In step S420, the in-motion sampling operation is executed in the same way as in step S320. Specifically, the in-motion sampling operation is achieved by a sequence of steps S101 to S108 including step S112 in FIG. 5. If, for example, the system-mounted vehicle has changed to the stopped-state during the in-motion sampling operation, a NO answer is obtained in step S421 in FIG. 10. The routine then returns back to step S401. Alternatively, if the in-motion sampling operation in step S420 has achieved success in sampling N detected values where the range $\sigma$ is less than the range threshold value $\sigma$th, a YES answer is obtained in step S421. The routine then proceeds to step S422.

In step S422, the zero-point determination portion F5 defines the detected values, as sampled in the in-motion sampling operation, in the form of the specifying population and determines the current zero-point equivalent value Yz. The routine then proceeds to step S423. The zero-point equivalent value Yz, as derived in step S422, corresponds to the in-motion determined value Yzrun. The in-motion determined value Yzrun is then saved in the zero-point storage portion M2 distinctively from the while-stationary determined value Yzstp.

In step S423, the time T elapsed since the while-stationary determined value Yzstp was derived is calculated. The weight $\beta(T)$ is updated to a value defined in relation to the time T most recently derived. The routine then proceeds to step S430. The elapsed time T since the while-stationary determined value Yzstp was derived may be measured by using a timer or calculated by subtracting a time when the while-stationary determined value Yzstp was obtained from the current time.

In step S430, the correction value determination portion F6 substitutes the while-stationary determined value Yzstp and the in-motion determined value Yzrun, as saved in the zero-point storage portion M2, and the weight a derived in step S413 or S423, into Eq. 2, as described above, to newly derive the correction value Q. The routine then terminates.

The weight $\beta(T)$, as used here, is determined to be decreased with an increase in time for which the system-mounted vehicle is kept in the moving state. Consequently, immediately after the while-stationary determined value Yzstp is derived while the system-mounted vehicle is stationary, the while-stationary determined value Yzstp strongly reflects on the correction value Q. The longer the time for which the system-mounted vehicle continues to move, the smaller a portion of the correction value Q which is derived as a function of the while-stationary determined value Yzstp will be, but the greater a portion of the correction value Q which is derived as a function of the in-motion determined value Yzrun, as updated cyclically while the system-mounted vehicle is moving, will be.

With the above arrangements, the correction value Q on which the while-stationary determined value Yzstp which has a higher degree of reliability is strongly reflected is used immediately after the system-mounted vehicle starts to move. Additionally, at a time when a duration of movement of the system-mounted vehicle has become longer than a given value, so that the zero point is expected to be changed due to a change in temperature, the correction value Q on which the in-motion determined value Yzrun, as updated while the system-mounted vehicle is moving, is strongly reflected is used.

Other Modifications

The above discussion has referred to the example where the yaw rate sensor 5 is used as the correction target sensor, but the steering angle sensor 3, the acceleration sensor 6, or a gyroscope sensor, not shown, may be selected as the correction target sensor. The sampling condition while the system-mounted vehicle is moving may be determined as a function of a physical quantity measured by a sensor which is a target to be corrected.

The sampling condition, as described above, includes three sub-conditions, but the sub-condition associated with the steered angle θ and/or the sub-condition associated with the travel speed V of the system-mounted vehicle may be omitted. For instance, the sub-condition using the curvature C and the sub-condition using the travel speed V may be both employed as the updating condition. The sampling condition may alternatively include a parameter other than those described above.

The above examples refer to the in-vehicle system 100 which is equipped with the camera 2, the position detector 7, and the navigation device 8 as a source device working to provide information about the curvature C of a road on which the system-mounted vehicle is moving, but the in-vehicle system 100 does not need to have all the three devices. The information about the curvature C of the travel road may alternatively be derived using a source device other than as described above.

The invention claimed is:

1. A sensor output correction apparatus comprising:
one or more processors;
a memory storing instructions that when executed by the one or more processors causes the sensor output correction apparatus to perform processes comprising:
a detected value acquisition process which sequentially acquires a detected value of a sensor which is mounted in a vehicle and detects a given physical quantity acting on the vehicle;
a stop determination process which determines whether the vehicle is parked or moving;
a curvature determining process which determines a curvature of a travel road on which the vehicle is moving;
a zero-point determination process which determines a zero-point equivalent value that is a value corresponding to a current zero point of the sensor using the detected value of the sensor derived by the detected value acquisition process in response to the curvature, based on determination by the curvature determining process, being less than or equal to a curvature threshold value at which the travel road is considered being a straight path, the zero-point determination process sequentially determining the zero-point equivalent value based on detected values derived by the detected value acquisition process while the stop determination process is determining that the vehicle is parked; and
a correction value determination process which determines a correction value for removing an error, based on arising from a deviation of the current zero point of the sensor, from the detected value of the sensor using the zero-point equivalent value determined by the zero-point determination process,
wherein the correction value determination process performs an addition operation to weight-add a while-moving determined value and a while-parked determined value to each other using a given weight to calculate the correction value, the while-moving determined value being the zero-point equivalent value, determined using the detected values sampled as a population while the vehicle is moving on a road where the curvature derived by the curvature determining process is less than or equal to the curvature threshold value, and
wherein a weight added to the while-parked determined value in the addition operation is decreased with an increase in time elapsed since the while-parked determined value was determined, while a weight added to the while-moving determined value in the addition operation is increased with an increase in time elapsed since the while-parked determined value was determined.

2. The sensor output correction apparatus as set forth in claim 1, further comprising a detected value storage which stores therein the detected value derived by the detected value acquisition process, wherein the correction value determination process defines a given number of the detected values, based on derivation by the detected value acquisition process while the curvature, based on determination by the curvature determining process, is less than or equal to the curvature threshold value and saved in the detected value storage being a population to calculate the correction value, wherein the correction value determination process calculates a degree of variation in the detected values contained in the population for use in calculating the correction value, and wherein in response to the degree of variation being in a given permissible range, the correction value determination process determines the correction value based on the population.

3. The sensor output correction apparatus as set forth in claim 1, wherein a reliability evaluation process evaluates a newly determined value to have a higher degree of reliability with an increase in elapsed time from when the zero-point equivalent value was determined previously and to when the newly determined value is determined.

4. The sensor output correction apparatus as set forth in claim 2, wherein the correction value determination process does not update the correction value in response to a difference between the zero-point equivalent value, based on determination by the zero-point determination process, and the zero-point equivalent value used to determine the correction value being used, lying in a given error range.

5. A sensor output correction apparatus comprising:
one or more processors;
a memory storing instructions that when executed by the one or more processors causes the sensor output correction apparatus to perform processes comprising:
a detected value acquisition process which sequentially acquires a detected value of a sensor which is mounted in a vehicle and detects a given physical quantity acting on the vehicle;
a stop determination process which determines whether the vehicle is stopped or moving;
a curvature determining process which determines a curvature of a travel road on which the vehicle is moving;
a zero-point determination process which determines a zero-point equivalent value that is a value corresponding to a current zero point of the sensor using the detected value of the sensor derived by the detected value acquisition process in response to the curvature, based on determination by the curvature determining process, being less than or equal to a curvature threshold value at which the travel road is considered being a straight path;
a correction value determination process which determines a correction value for removing an error, based on arising from a deviation of the current zero point of the sensor, from the detected value of the sensor using the zero-point equivalent value determined by the zero-point determination process; and
a reliability evaluation process which evaluates a degree of reliability of the zero-point equivalent value determined by the zero-point determination process,
wherein the zero-point determination process sequentially determines the zero-point equivalent value based on detected values derived by the detected value acquisition process while the stop determination process is determining that the vehicle is stopped, and wherein the correction value determination process determines the correction value using a while-stationary determined value that is the zero-point equivalent value, based on determination by the zero-point determination process using the detected values derived in response to the vehicle being stopped,
wherein the correction value determination process performs an addition operation to weight-add a newly determine value and the correction value, based on being used, to newly calculate the correction value, a newly determined value being the zero-point equivalent value newly determined by the zero-point determination process, and wherein a weight added to the newly determined value in the addition operation is increased with an increase in degree of reliability of the newly determined value, based on evaluation by the reliability evaluation process,
wherein in response to the newly determined value being given by the while-stationary determined value, the reliability evaluation process determines that the newly determined value has a higher reliability than that of an in-motion determined value that is the zero-point equivalent value determined by a population of the detected values sampled while the vehicle is moving on a road where the curvature is less than or equal to the curvature threshold value, and
wherein the curvature determining process determines the curvature of the road being a curvature of a lane boundary line on the road which is obtained by subjecting image recognition processing to an image captured by a vehicle-mounted camera designed to capture an image of a frontal or rearward view of the vehicle, and in response to the newly determined value being given by the in-motion determined value, the reliability evaluation process evaluates the newly determined value to have a higher degree of reliability with an increase in recognizable range in which it is possible to perceive the lane boundary line through the image recognition processing.

* * * * *